US012756721B2

(12) United States Patent
Peterson et al.

(10) Patent No.: US 12,756,721 B2
(45) Date of Patent: Oct. 6, 2026

(54) REMOTE ACTION AUTHORIZATION

(71) Applicant: Lenovo (Singapore) Pte. Ltd., Singapore (SG)

(72) Inventors: Nathan J. Peterson, Oxford, NC (US); Russell Speight VanBlon, Raleigh, NC (US); Arnold S. Weksler, Raleigh, NC (US); Mark Patrick Delaney, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 365 days.

(21) Appl. No.: 17/111,080

(22) Filed: Dec. 3, 2020

(65) Prior Publication Data

US 2022/0182392 A1 Jun. 9, 2022

(51) Int. Cl.
*H04L 29/06* (2006.01)
*H04L 9/40* (2022.01)
*H04W 12/08* (2021.01)

(52) U.S. Cl.
CPC .......... *H04L 63/108* (2013.01); *H04L 63/101* (2013.01); *H04W 12/08* (2013.01)

(58) Field of Classification Search
CPC ..... H04L 63/108; H04L 63/101; H04W 12/08
See application file for complete search history.

(56) References Cited

U.S. PATENT DOCUMENTS

2017/0161706 A1* 6/2017 Patel .................... G06Q 20/327
2018/0061158 A1* 3/2018 Greene .................. G06V 20/52
2018/0144615 A1* 5/2018 Kinney .................... G07C 9/00
2019/0259232 A1* 8/2019 Nandakumar .......... G07F 17/10
2021/0065172 A1* 3/2021 Karnik ................. G06Q 20/385
2022/0052870 A1* 2/2022 Guo ....................... H04L 63/108
2022/0148354 A1* 5/2022 Ozono ...................... G06T 7/00

FOREIGN PATENT DOCUMENTS

AU 2017384385 B2 * 9/2022 ........... A47J 31/407
JP 2018520952 A * 8/2018
WO WO-9618980 A1 * 6/1996 ............ G06Q 20/00
WO WO-2018003266 A1 * 1/2018 ............. A47J 27/00

* cited by examiner

*Primary Examiner* — Vance M Little
(74) *Attorney, Agent, or Firm* — FERENCE & ASSOCIATES LLC

(57) ABSTRACT

One embodiment provides a method, including: receiving, at an information handling device connected to a network of other devices, a user command to initiate an action, wherein the action is associated with a real-world physical object; transmitting, to another device associated with the network, details associated with the action, wherein the another device is associated with an authorized user; determining, by monitoring for an authorization indication from the another device, whether the information handling device is authorized to initiate the action; and initiating the action responsive to identifying receipt of the authorization indication from the another device. Other aspects are described and claimed.

14 Claims, 3 Drawing Sheets

REMOTE ACTION AUTHORIZATION

BACKGROUND

The prevalence of home automation systems in residential homes has increased rapidly over the past decade. These systems often contain a plurality of wirelessly interconnected devices with varying functionality that may allow a user to complete a variety of different tasks. For example, certain systems may monitor and/or control home attributes such as lighting, climate, entertainment systems, appliances, home security features, and a variety of other home aspects.

BRIEF SUMMARY

In summary, one aspect provides a method, comprising: receiving, at an information handling device connected to a network of other devices, a user command to initiate an action, wherein the action is associated with a real-world physical object; transmitting, to another device associated with the network, details associated with the action, wherein the another device is associated with an authorized user; determining, by monitoring for an authorization indication from the another device, whether the information handling device is authorized to initiate the action; and initiating the action responsive to identifying receipt of the authorization indication from the another device.

Another aspect provides an information handling device, comprising: a processor; a memory device that stores instructions executable by the processor to: receive a user command to initiate an action, wherein the action is associated with a real-world physical object; transmit, to another device associated with a network the information handling device is connected to, details associated with the action, wherein the another device is associated with an authorized user; determine, by monitoring for an authorization indication from the another device, whether the information handling device is authorized to initiate the action; and initiate the action responsive to identifying receipt of the authorization indication from the another device.

A further aspect provides a product, comprising: a storage device that stores code, the code being executable by a processor and comprising: code that receives a user command to initiate an action, wherein the action is associated with a real-world physical object; code that transmits details associated with the action to another device associated with a network that an information handling device housing the storage device is connected to, wherein the another device is associated with an authorized user; code that determines, by monitoring for an authorization indication from the another device, whether the information handling device is authorized to initiate the action; and code that initiates the action responsive to identifying receipt of the authorization indication from the another device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
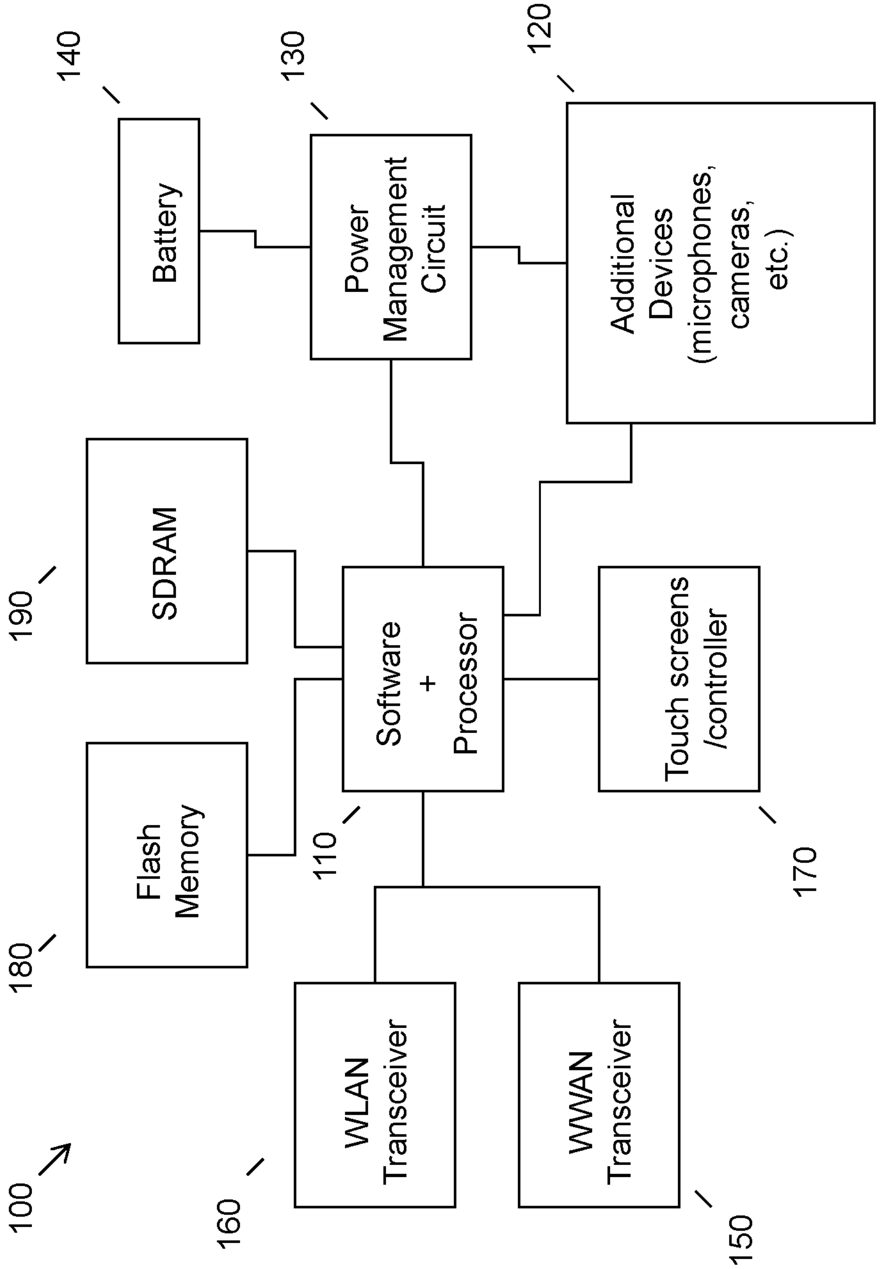
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

One common device in many home automation systems is a smart doorbell/front door device ("front door device"). The front door device is an internet-connected device (e.g., connected to one or more other home automation devices via the Internet of Things (IoT), etc.) that notifies a homeowner's smartphone or other designated electronic device when a visitor arrives at the door. Activation of the front door device may occur manually (e.g., when a visitor presses an activation button integrated into the front door device, etc.) or dynamically (e.g., when a built-in motion sensor detects proximate movement, etc.). Thereafter, a homeowner may remotely interact with the visitor via an application on their device (e.g., a homeowner may be presented with a video feed of the visitor and may communicate with them audibly via an integrated microphone and speaker on the front door device, etc.).

Although capable of performing a variety of different functions, conventional front door devices are unable to authorize the performance of certain actions associated with command requests provided by a physically present individual ("individual"). For example, an individual may request the front door device to obtain access to a particular area (e.g., by requesting the front door device to unlock a gate or door, etc.) or a particular object (e.g., by requesting the front door device to unlock a mailbox, a lockbox, another type of secure object, etc.). As another example, an individual may wish to sell one or more items to the homeowner.

One existing solution may allow the homeowner to communicate with the individual and establish an alternative time for them to return (e.g., when the homeowner is home, etc.). However, the individual may not be able to return at a convenient time, if at all. In another existing solution, in the case of an item sale the homeowner and individual may attempt to facilitate the transaction remotely. For example, the seller may provide the homeowner with their User ID for a mobile payment service, which the homeowner may thereafter use to transmit funds to an account associated with the seller. However, this process is time-consuming, burdensome, and prone to costly mistakes (e.g., if the homeowner sends funds to the incorrect User ID, etc.).

Accordingly, a method is provided that enables various device actions to be authorized conveniently and securely via a homeowner's front door device. In an embodiment, a user command may be received at a homeowner's front door device that directs the device to initiate a particular action. An embodiment may then determine whether the front door device has authorization to proceed with initiation of the action. In one scenario, an embodiment may send an alert notification to a device associated with the homeowner and ask for their authorization to proceed with the action. In another scenario, an embodiment may access a list of initiation authorizations (e.g., actions that have been previously authorized by the homeowner, etc.) to determine whether the current action is authorized. Responsive to determining that the current action is authorized, an embodiment may thereafter initiate the action. For instance, the front door device may provide a passcode to an individual interacting with the front door device that, upon provision by them to an input device associated with the front door device, may open a particular item (e.g., a front door or gate, etc.). Additionally or alternatively, the front door device may audibly or visually transmit a payment code that, upon capture/detection by a corresponding device associated with the individual, may be used to complete a transaction. Such a method may therefore allow various actions to be authorized securely without the homeowner being physically present.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
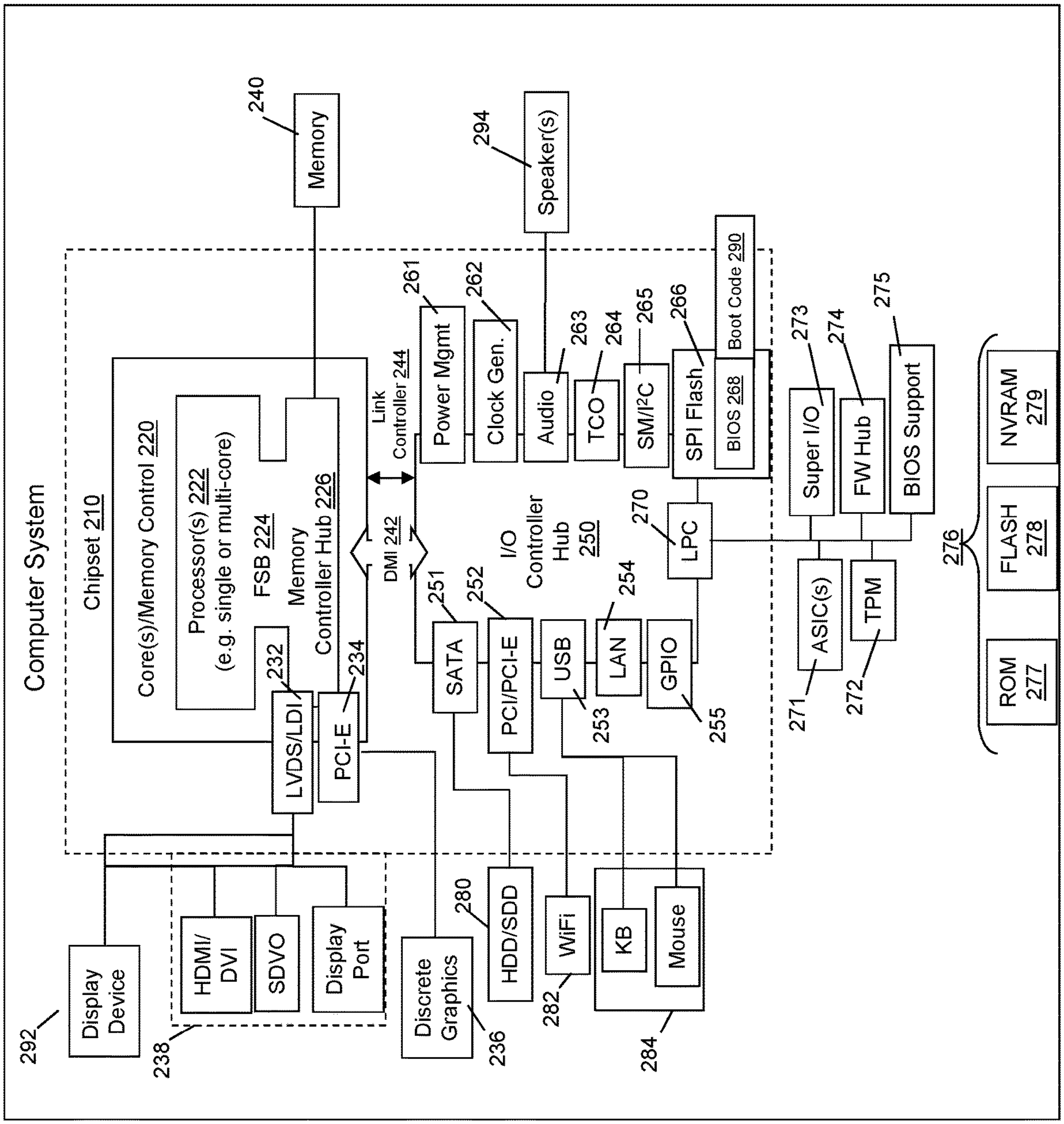
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of communicating with one or more other devices.

Figure 3:
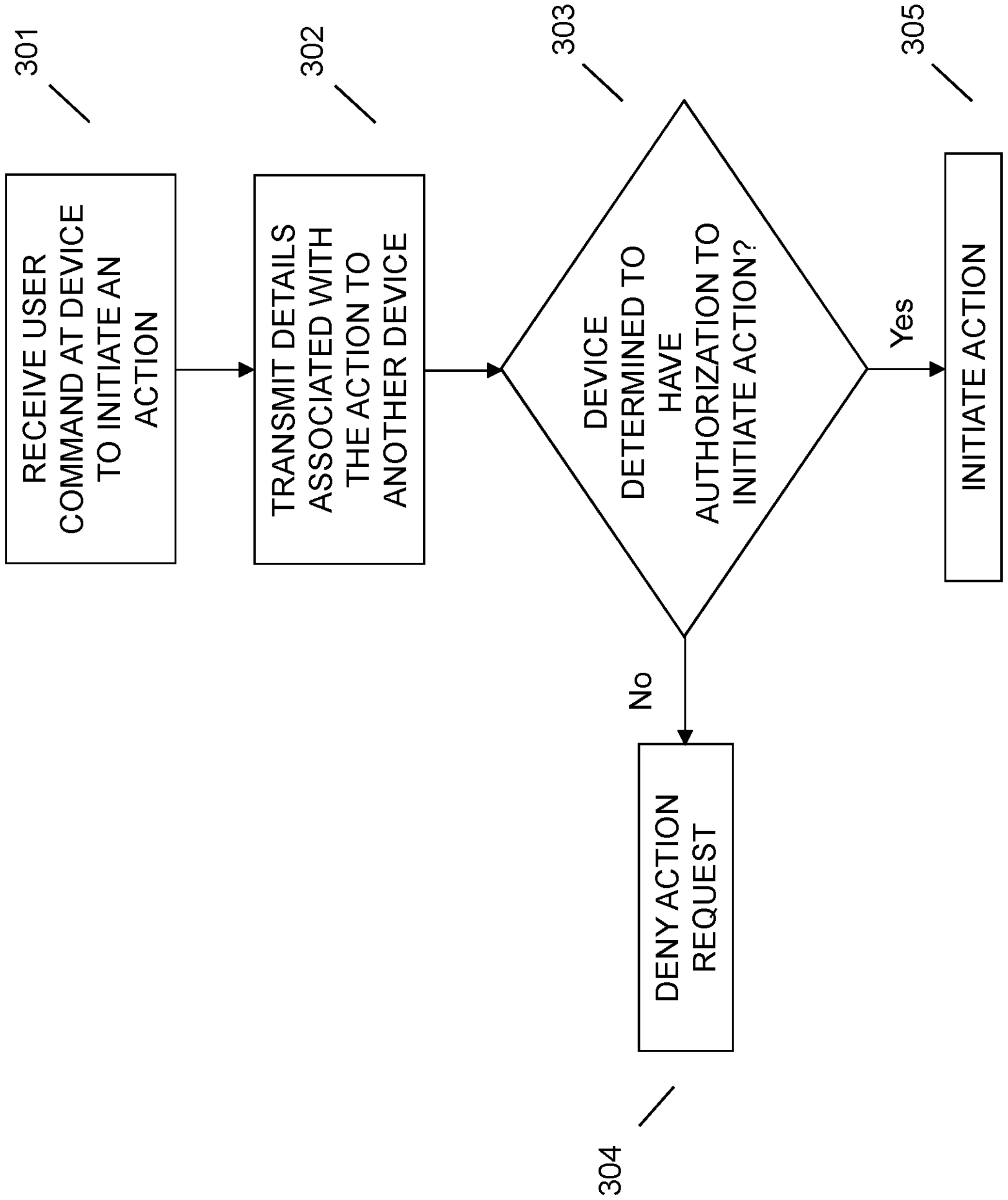
FIG. 3 illustrates an example method of initiating an action.

Referring now to FIG. 3, a method for authorizing a remote action using a front door device is provided. At 301, a user command provided by an individual may be received at a front door device to initiate an action. In the context of this application, a front door device may refer to virtually any IoT information handling device (e.g., a smart doorbell, a smart camera, a smart speaker, a combination thereof, etc. that is connected to a network of other home automation devices, etc.) integrated or situated on an exterior portion of a user's home that may detect and/or interact with other individuals that come to the home. It is important to note that although referred to throughout this application as a "front door" device, such a designation is not limiting and the device as described herein may be positioned anywhere around the user's property (e.g., a back door, a side door, a garage door, a gate entrance, etc.). It is also important to note that although the term "homeowner" is frequently mentioned throughout this application with respect to the front door device, such a designation is not strictly limited to the actual owner(s) of the home, but rather, may also be applicable to other home occupants and/or authorized users of the front door device.

In an embodiment, the user command may be received/detected using one or more of the following techniques. For example, in an embodiment, an individual that comes to the home may select an available action from a list presented by the front door device (e.g., the list of available actions may be presented visually, audibly, a combination thereof, etc.). In another embodiment, the action that an individual wants the front door device to perform may be deduced dynamically by the front door device. For example, the front door device may have access to contextual knowledge (e.g., via accessing available calendar or schedule data, etc.) of individuals expected to arrive at the home in a predetermined time window (e.g., expected deliverymen, expected salesmen, etc.) as well as their intention for visiting the home (e.g., to drop off a package, facilitate a transaction, etc.). Upon detecting an individual that approaches the home within that time window, an embodiment may present to them an option to perform an action associated with their intention (e.g., for a deliverymen the front door device may present an "open gate" option, for a salesperson the front door device may present a "transaction" option, etc.). In another example, the front door device may utilize one or more sensors (e.g., camera sensors, microphones, etc.) to identify characteristics of an approaching individual or object (e.g., a drone, etc.) that may provide an indication of their intention for visiting the home (e.g., an embodiment may identify a sellers uniform or company logo on a drone, an embodiment may determine the identity of objects accompanying the individual or object, etc.).

At 302, responsive to receiving the action initiation command, details associated with the action may be transmitted to a user device associated with the homeowner. The details may include one or more of a description of an object-of-interest (e.g., a description of the dimensional and/or visual characteristics of a package, a description of certain products-for-sale, etc.), a description of the individual (e.g., a description of the individuals uniform or identity, etc.), an identification of an object influenced by the action (e.g., an identification that the action may unlock a front door or gate, etc.), an identification of the cost associated with initiation of the action (e.g., an identification of the cost of products in a transaction, etc.). In an embodiment, the details may be obtained using one or more different means (e.g., the details may be manually provided by the individual, the details may be dynamically deduced by the front door device via utilization of one or more sensors and/or by access to one or more data stores, etc.).

In an embodiment, the user device may be virtually any electronic device designated by the homeowner to receive action details (e.g., a smart phone, a wearable device, a tablet, a combination thereof, etc.). In an embodiment, the communication of the details may be transmitted to the user device using one or more communication mediums (e.g., via SMS text message, via email, via an application associated with a remote payment process, etc.). After transmission to the user device, an embodiment may determine whether an authorization indication is received back from the user device (e.g., produced by a confirmation selection of the homeowner, etc.). If no authorization indication is received (e.g., within a predetermined timeframe, etc.), then an embodiment may not authorize initiation of the action.

In addition to or in lieu of the foregoing, responsive to receiving the action initiation command, an embodiment may access a set of action initiation authorizations. The set may be a listing of action types that the homeowner has previously authorized. For example, the set may include identifications of authorized transactions for certain products and/or quantities, identifications of certain authorized individuals (e.g., individuals that the homeowner indicated a transaction can be commenced with, individuals a homeowner indicated doors or gates could be unlocked for, etc.), identifications for actions authorized to be conducted at specific times of day (e.g., times of day that certain transactions may be facilitated, times of day that certain secure objects may be unlocked, etc.), and the like. In an embodiment, the set may be located an accessible storage database (e.g., stored locally on the front door device, remotely on another device or server, etc.). In an embodiment, details associated with the current action may be identified by the front door device (as previously described above) and thereafter used to determine whether the current action is an authorized action in the set. If no commonality can be found between the current action and the set of previously authorized actions, an embodiment may not authorize the current action. Such an embodiment may be used as an additional check to confirm that the commanded action is truly authorized.

Responsive to determining that authorization was not received, at 303, an embodiment may, at 304, deny the action request (i.e., the front door device may not initiate the action). Additionally or alternatively, the front door device may provide (e.g., using one or more output devices associated with the front door device, etc.) an indication regarding why the action request was denied (e.g., permission was not granted by the homeowner or another authorized user, an incorrect password was entered, a predetermined timeframe for conducting the transaction has expired, etc.). Conversely, responsive to determining, at 303, that authorization was received, an embodiment may, at 305, facilitate initiation of the action.

In an embodiment, upon receiving authorization to complete the action an embodiment may present an authorization confirmation notification to the individual. This notification may be presented to the individual using an output device integrally or operatively coupled to the front door device (e.g., a display screen, a speaker, a combination thereof, etc.) and may inform them that authorization for the action has been received.

In an embodiment, as part of the confirmation notification, a passcode (e.g., a character-based code, a numeric code, an alphanumeric code, etc.) may be communicated to the individual (e.g., on a display device, through a speaker, etc.). An embodiment may provide a request (e.g., transmitted substantially concurrently with the passcode, etc.) to enter the passcode into a relevant input portion of the front door device. Responsive to determining that the passcode was entered correctly, an embodiment may complete the requested action (e.g., by unlocking a door or gate, by releasing the appropriate amount of funds to a known account associated with a seller, etc.), and the like.

In the case of a transaction, along with or after the authorization indication is presented to the individual, the front door device may request the seller to bring their electronic device within a predetermined proximate distance of the front door device (e.g., within two inches of the front door device, etc.). Responsive to receiving an indication that the devices are within this predetermined distance, an embodiment may initiate a contactless, Near Field Communication ("NFC") payment protocol as conventionally known in the art. More particularly, an embodiment may transfer the requisite amount of funds from an account associated with the homeowner to an account associated with the seller. In an embodiment, a visual code pattern may be presented to the seller (e.g., on a display device, etc.) along with, or separate from, the authorization indication. In an embodiment, the visual code pattern may be, or operate similar to, a Quick Response ("QR") code that, when scanned by a device associated with the seller, would allow the seller to perform a contactless transaction. More particularly, the front door device may receive an indication that the presented visual code pattern was appropriately scanned and may thereafter initiate a contactless, NFC payment protocol as conventionally known in the art and as described above.

In an embodiment, an indication of an authorization window may be provided to the individual. The authorization window may identify a timeframe that an action is authorized for (e.g., a door may be unlocked for the next minute, a transaction may be conducted within the next 10 minutes, etc.). If an individual does not take advantage of the action allowance window (e.g., an individual is unable to complete a transaction within the window, etc.), or exceed their action allowance timeframe, an embodiment may perform some type of protective function. For example, if an individual does not close an unlocked door after one minute, then an alarm may sound. As another example, if the individual is unable to complete a transaction within the allotted timeframe, the transaction may be cancelled. In the case of sale, an embodiment may additionally delay full transmission of payment until a confirmation is received that the homeowner has physically obtained the device. For example, upon detecting that authorization for a transaction has been received, a funds transfer may be initiated in which the funds are transferred from the homeowners account to a buffer account. The funds may be held in this buffer until a homeowner confirms to the front door device that they have received and/or accepted the products, at which point the funds may be released from the buffer and transferred to an account associated with the seller.

The various embodiments described herein thus represent a technical improvement to conventional methods for remotely authorizing the performance of actions. Using the techniques described herein, an embodiment may receive a user command to initiate an action. An embodiment may then determine whether authorization is received to initiate the action. This determination may be aided by receipt of input from an authorized user or may be deduced dynamically by the front porch device without user assistance. Responsive to determining that the action is authorized, an embodiment may initiate the action using one or more methods described above.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, R F, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system, comprising:

a processor;

a memory device operatively connectable to the processor and configured to store, execute, and send instructions via system hardware to a user interface;

a front door device configured to receive a user command from an authorized user to initiate an action associated with a real-world physical object and in response to detecting the real-world physical object at a predetermined location with respect to the front door device, wherein to receive the user command comprises dynamically identifying the action to be initiated from contextual knowledge of a homeowner regarding the authorized user interacting with the front door device;

the front door device configured to transmit, to another device of the authorized user and associated with a network the front door device is connected to, details associated with the action and the real-world physical object, wherein the another device comprises a contextual knowledge of the authorized user, wherein the contextual knowledge of the authorized user comprises a predetermined intention of the authorized user interacting with the front door device;

the front door device configured to receive data corresponding to the predetermined intention and generates a signal responsive to determining, by monitoring for and receiving an authorization indication from the another device, whether the front door device is authorized to initiate the action, wherein to determine comprises receiving the authorization indication back at the front door device from the another device in response to identifying the authorized user, wherein to determine the another device is authorized comprises identifying the predetermined intention of the authorized user interacting with the front door device matches an intention of the homeowner and the real-world physical object at the predetermined location is within a proximate distance from the front door device; and the front door device configured to initiate the action responsive to identifying receipt of the authorization indication from the another device, wherein to initiate comprises presenting, using an output device associated with the front door device, an authorization confirmation indicating that authorization was received to initiate the action within a predetermined period of time and wherein to initiate comprises delaying initiation of the action until the real-world physical object presence confirmation is received from an information handling device of the homeowner;

wherein to initiate the action comprises maintaining authorization for the action for the predetermined period of time and further comprises dynamically activating a protection protocol responsive to identifying that the action has not been completed in the predetermined period of time, wherein the identifying that the action has not been completed is at least partially dependent on the real-world physical object not being within the proximate distance from the front door device.

2. The system of claim 1, wherein the details are selected from the group consisting of: real-world physical object description information, real-world physical object status information, real-world physical object quantity information, real-world physical object value information, and real-world physical object owner information.

3. The system of claim 1, wherein the instructions are further executable by the processor to:

access, in an accessible data store, a set of action initiating authorizations; and determine, using a processor, whether the action is listed in the set;

wherein the instructions executable by the processor to initiate comprise instructions executable by the processor to initiate the action responsive to further determining that the action is listed in the set.

4. The system of claim 1, wherein the instructions executable by the processor to initiate further comprise instructions executable by the processor to:

present, using the output device and as part of the authorization confirmation, a visual code;

determine whether the visual code was captured by the another device; and complete the action responsive to receiving an indication that the visual code was captured.

5. The system of claim 1, wherein the instructions executable by the processor to initiate further comprise instructions executable by the processor to:

present, using the output device, a passcode to a user of the another electronic device of the authorized user;

determine whether the passcode was entered into an input device associated with the information handling device; and complete the action responsive to determining that the passcode was entered into the input device.

6. The system of claim 5, wherein the instructions executable by the processor to initiate comprise instructions executable by the processor to delay initiation of the action until the real-world object presence confirmation is received from the authorized user of the information handling device.

7. A product, comprising:

a storage device that stores code, the code being executable by a processor and configured to execute and send instructions via hardware to a user interface;

code that configures the front door device to receive, at an information handling device housing the storage device and being connected to a network of other devices, a user command from an authorized user to initiate an action associated with a real-world physical object and in response to detecting the real-world physical object at a predetermined location with respect to the front door device, wherein the code that receives the user command comprises dynamically identifying the action to be initiated from contextual knowledge of a homeowner regarding the authorized user interacting with the front door device;

code that configures the front door device to transmit details associated with the action and the real-world physical object to another device associated with the network the front device is connected to, wherein the another device comprises a contextual knowledge of the authorized user, wherein the contextual knowledge of the authorized user comprises a predetermined intention of the authorized user interacting with the front door device;

code that configures the front door device to receive data corresponding to the predetermined intention and generates a signal responsive to determining, by monitoring for and receiving an authorization indication from the another device, whether the front door device is authorized to initiate the action, wherein the code that determines the another device is authorized comprises identifying the predetermined intention of a predetermined user interacting with the front door device matches an intention of the homeowner and the real-world physical object at the predetermined location is within a proximate distance from the information handling device; and code that configures the front door device to initiate the action responsive to identifying receipt of the authorization indication from the another device, wherein the code that initiates comprises presenting, using an output device associated with the front door device, an authorization confirmation indicating that authorization was received to initiate the action within a predetermined period of time and wherein the code to initiate comprises delaying initiation of the action until the real-world physical object presence confirmation is received from an information handling device of the homeowner;

wherein the code that initiates the action comprises maintaining authorization for the action for the predetermined period of time and further comprises dynamically activating a protection protocol responsive to identifying that the action has not been completed in the predetermined period of time, wherein the identifying that the action has not been completed is at least partially dependent on the real-world physical object not being within the proximate distance from the front door device.

8. A system, comprising:

a processor;

a memory device operatively connectable to the processor and configured to store, execute, and send instructions via system hardware to a user interface;

a front door device configured to receive a user command from an authorized user to initiate at least one of a plurality of actions securely without the homeowner being physically present that is associated with a real-world physical object and in response to detecting the real-world physical object at a predetermined location with respect to the front door device, wherein to receive the user command comprises dynamically identifying the at least one of the plurality of actions without the homeowner being physically present to be initiated from contextual knowledge of the homeowner regarding the authorized user interacting with the front door device;

the front door device configured to transmit, to another device of the authorized user and associated with a network the front door device is connected to, details associated with the at least one action and the real-world physical object, wherein the another device comprises a contextual knowledge of the authorized user, wherein the contextual knowledge of the authorized user comprises a predetermined intention of the authorized user interacting with the front door device;

the front door device configured to receive data corresponding to the predetermined intention and generates a signal responsive to determining, by monitoring for and receiving an authorization indication from the another device, whether the front door device is authorized to initiate the at least one action, wherein to determine comprises receiving the authorization indication back at the front door device from the another device in response to identifying the authorized user, wherein to determine the another device is authorized comprises identifying the predetermined intention of the authorized user interacting with the front door device matches an intention of the homeowner and the real-world physical object at the predetermined location is within a proximate distance from the front door device; and the front door device configured to initiate the at least one action responsive to identifying receipt of the authorization indication from the another device, wherein to initiate comprises presenting, using an output device associated with the front door device, an authorization confirmation indicating that authorization was received to initiate the at least one action within a predetermined period of time and wherein to initiate comprises delaying initiation of the at least one action until the real-world physical object presence confirmation is received from an information handling device of the homeowner;

wherein to initiate the at least one action comprises maintaining authorization for the at least one action for the predetermined period of time and further comprises dynamically activating a protection protocol responsive to identifying that the at least one action has not been completed in the predetermined period of time, wherein the identifying that the at least one action has not been completed is at least partially dependent on the real-world physical object not being within the proximate distance from the front door device.

9. The system of claim 8, wherein to initiate the at least one of a plurality of actions securely without the homeowner being physically present comprises transmitting a payment code for completion of a transaction upon a detection of a delivery from the authorized user utilizing the front door device.

10. The system of claim 8, wherein the details are selected from the group consisting of: real-world physical object description information, real-world physical object status information, real-world physical object quantity information, real-world physical object value information, and real-world physical object owner information.

11. System of claim 8, wherein the instructions are further executable by the processor to:

access, in an accessible data store, a set of action initiating authorizations; and determine, using a processor, whether the action is listed in the set;

wherein the instructions executable by the processor to initiate comprise instructions executable by the processor to initiate the action responsive to further determining that the action is listed in the set.

12. The system of claim 8, wherein the instructions executable by the processor to initiate further comprise instructions executable by the processor to:

present, using the output device and as part of the authorization confirmation, a visual code;

determine whether the visual code was captured by the another device; and complete the action responsive to receiving an indication that the visual code was captured.

13. The system of claim 8, wherein the instructions executable by the processor to initiate further comprise instructions executable by the processor to:

present, using the output device, a passcode to of the another device of the authorized user;

determine whether the passcode was entered into an input device associated with the information handling device; and complete the action responsive to determining that the passcode was entered into the input device.

14. The system of claim 13, wherein the instructions executable by the processor to initiate comprise instructions executable by the processor to delay initiation of the action until the real-world object presence confirmation is received from the authorized user of the information handling device.

* * * * *